US010270072B2

(12) United States Patent
Bull et al.

(10) Patent No.: US 10,270,072 B2
(45) Date of Patent: Apr. 23, 2019

(54) RECHARGEABLE BATTERY AND METHOD

(71) Applicant: General Electric Company, Schenectady, NY (US)

(72) Inventors: Roger Bull, Staffordshire (GB); James Sudworth, Staffordshire (GB); Paul Sudworth, Staffordshire (GB); Stuart Towle, Staffordshire (GB)

(73) Assignee: General Electric Company, Schenectady, NY (US)

( * ) Notice: Subject to any disclaimer, the term of this patent is extended or adjusted under 35 U.S.C. 154(b) by 124 days.

(21) Appl. No.: 15/149,523

(22) Filed: May 9, 2016

(65) Prior Publication Data

US 2016/0254507 A1 Sep. 1, 2016

Related U.S. Application Data

(63) Continuation of application No. 13/341,052, filed on Dec. 30, 2011, now abandoned.

(51) Int. Cl.
*H01M 2/10* (2006.01)
*H01M 10/04* (2006.01)
(Continued)

(52) U.S. Cl.
CPC ....... *H01M 2/1088* (2013.01); *H01M 2/1077* (2013.01); *H01M 10/0481* (2013.01);
(Continued)

(58) Field of Classification Search
None
See application file for complete search history.

(56) References Cited

U.S. PATENT DOCUMENTS 3,056,850 A * 10/1962 Rauske ............... H01M 2/0202
429/157
3,219,485 A * 11/1965 Foecking ............ H01M 2/105
429/99
(Continued)

FOREIGN PATENT DOCUMENTS

JP 51162930 U 12/1976
JP 5469333 U 5/1979
(Continued)

OTHER PUBLICATIONS

Unofficial English Translation of Japanese Office Action issued in connection with corresponding JP Application No. 2012280441 dated Jan. 10, 2017.
(Continued)

*Primary Examiner* — Maria Laios
(74) *Attorney, Agent, or Firm* — Dority & Manning, P.A.

(57) ABSTRACT

A method of assembling a rechargeable battery is disclosed. The method includes inserting rechargeable energy storage cells into a battery housing, the battery housing having a base portion, a side portion extending from the base portion, and an aperture defined by the side portion, wherein the rechargeable energy storage cells are inserted into the battery housing through the aperture; installing an insulator on the rechargeable energy storage cells; and securing a housing cover to the battery housing such that the insulator and the rechargeable energy storage cells are maintained in compression between the housing cover and the housing base portion. Also disclosed is a rechargeable battery including a battery housing, a housing cover, a plurality of rechargeable energy storage cells disposed within the battery housing, and an insulator disposed between the rechargeable energy storage cells and the housing cover and maintained in compression.

13 Claims, 3 Drawing Sheets

(51) Int. Cl.
*H01M 10/39* (2006.01)
*H01M 10/615* (2014.01)
*H01M 10/653* (2014.01)
*H01M 10/658* (2014.01)

(52) U.S. Cl.
CPC ..... *H01M 10/3909* (2013.01); *H01M 10/399* (2013.01); *H01M 10/615* (2015.04); *H01M 10/653* (2015.04); *H01M 2/1094* (2013.01); *H01M 10/658* (2015.04); *Y10T 29/49108* (2015.01)

(56) References Cited

U.S. PATENT DOCUMENTS

| | | | | |
|---|---|---|---|---|
| 3,972,734 | A * | 8/1976 | King | H01M 6/36 429/159 |
| 3,988,163 | A * | 10/1976 | Sklarchuk | H01M 10/3909 429/103 |
| 4,224,383 | A * | 9/1980 | Taylor | H01M 2/1072 429/149 |
| 4,407,911 | A * | 10/1983 | Hooke | H01M 2/105 429/159 |
| 5,578,393 | A | 11/1996 | Haskins | |
| 2008/0280198 | A1 * | 11/2008 | Kumar | H01M 2/1077 429/138 |
| 2010/0062324 | A1 * | 3/2010 | Ooyama | H01M 2/0404 429/97 |
| 2010/0072177 | A1 | 3/2010 | Kawaharazaki et al. | |

FOREIGN PATENT DOCUMENTS

| | | |
|---|---|---|
| JP | 57151859 U | 9/1982 |
| JP | 59186953 U | 12/1984 |
| JP | 6127062 A | 2/1986 |
| JP | 03283272 A | 12/1991 |
| JP | 05343041 A | 12/1993 |
| JP | 05343042 A | 12/1993 |
| JP | 1186900 A | 3/1999 |
| JP | 2000040520 A | 2/2000 |
| JP | 2005293907 A | 10/2005 |
| JP | 2008202740 A | 9/2008 |
| JP | 2010033796 A | 2/2010 |
| JP | 2011238521 A | 11/2011 |
| WO | WO-2008129805 A1 * | 10/2008 .......... H01M 2/0404 |

OTHER PUBLICATIONS

Unofficial English Translation of Japanese Search Report issued in connection with corresponding JP Application No. 2012280441 dated Mar. 31, 2017.

* cited by examiner

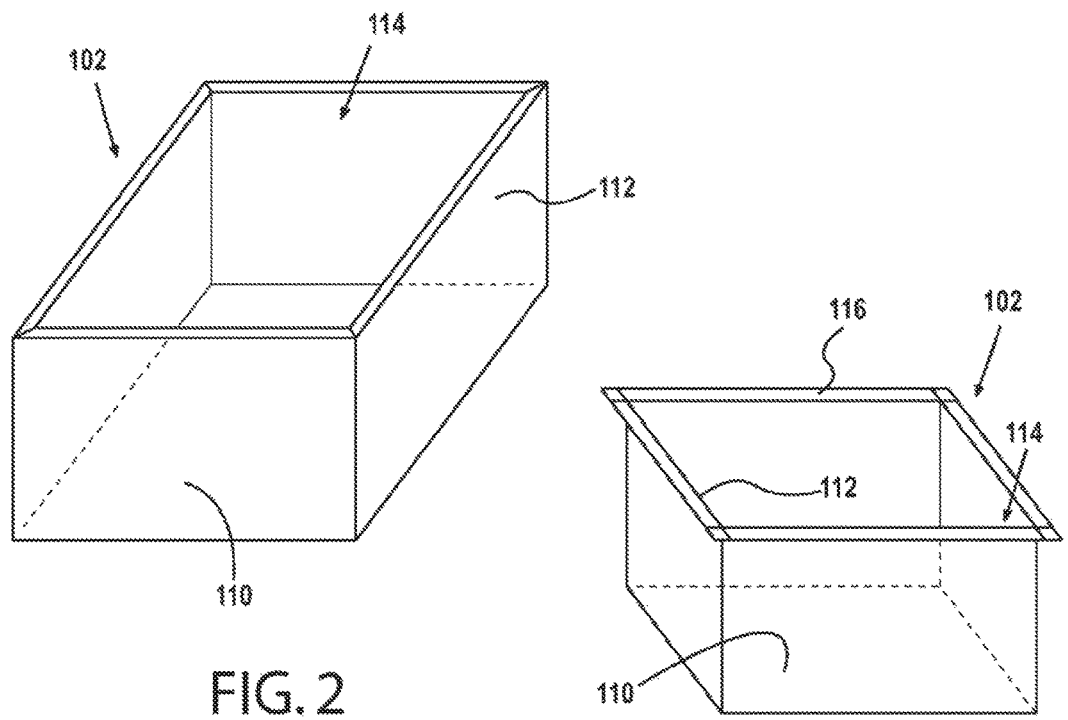
FIG. 2
FIG. 3
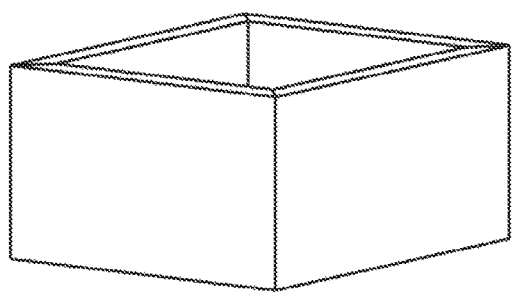
FIG. 4
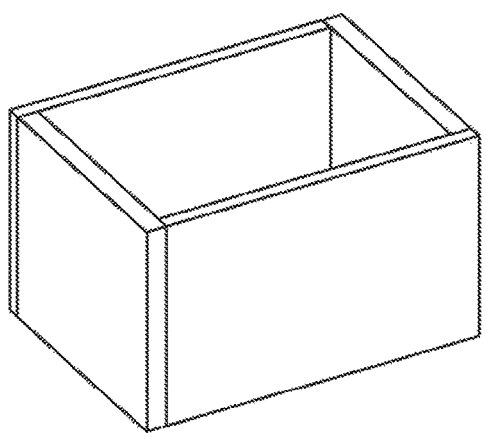
FIG. 5

RECHARGEABLE BATTERY AND METHOD

PRIORITY CLAIM

The present application is a continuation of U.S. application Ser. No. 13/341,052 having a filing date of Dec. 30, 2011. Applicant claims priority to and benefit of all such applications and incorporate all such applications herein by reference.

BACKGROUND

Technical Field

Embodiments of the invention relate to rechargeable batteries. Other embodiments relate to a method and apparatus for assembling a rechargeable battery.

BACKGROUND

Energy storage devices may have challenges with damage and manufacturability. Loosely packaged batteries may result in vibration or shaking, which may damage the energy storage cells or connections between the energy storage cells, especially when the batteries are used in vehicles or other moving platforms.

It may be desirable to have a battery package that differs from those packages that are currently available.

SUMMARY

Presently disclosed is a method of assembling a rechargeable battery. In an embodiment, the method includes inserting rechargeable energy storage cells into a battery housing, the battery housing having a base portion, a side portion extending from the base portion, and an aperture defined by the side portion, wherein the rechargeable energy storage cells are inserted into the battery housing through the aperture; installing an insulator on the rechargeable energy storage cells; and securing a housing cover to the battery housing such that the insulator and the rechargeable energy storage cells are maintained in compression between the housing cover and the housing base portion.

Also disclosed is a rechargeable battery. In an embodiment, a battery housing having a base portion, a side portion extending from the base portion, and an aperture defined by the side portions; a housing cover secured to the battery housing; a plurality of rechargeable energy storage cells disposed within the battery housing with at least a portion of the energy storage cells electrically connected to one another; and an insulator disposed between the rechargeable energy storage cells and the housing cover; wherein the insulator and the energy storage cells are maintained in compression between the housing cover and the housing base portion.

In another embodiment, the rechargeable battery comprises a battery housing having a base portion, a side portion extending from the base portion, and an aperture defined by the side portions. The rechargeable battery further comprises a housing cover secured to the side portion of the battery housing and covering the aperture. The rechargeable battery further comprises a plurality of electrically interconnected, rechargeable energy storage cells disposed within the battery housing. The rechargeable battery further comprises a plurality of mica sheets disposed between the rechargeable energy storage cells and the housing cover. The plurality of mica sheets and the energy storage cells are maintained in compression between the housing cover and the housing base portion, for inhibiting movement of the energy storage cells between the housing cover and the housing base portion. The amount of compression comprises: 1.7 kpa or more of compressive force; and/or a compressive force suitable to compress the plurality of mica sheets by at least 5% in the vertical dimension from an uncompressed state of the plurality of mica sheets.

BRIEF DESCRIPTION OF DRAWINGS

Reference is made to the accompanying drawings in which particular embodiments and further benefits of the invention are illustrated as described in more detail in the description below, in which:

FIG. 2 is a perspective view of an enclosure for an energy storage device;

FIG. 3 is a perspective view of another enclosure for an energy storage device;

FIG. 4 is a perspective view of another enclosure for an energy storage device;

FIG. 5 is a perspective view of another enclosure for an energy storage device;

DETAILED DESCRIPTION

Figure 1:
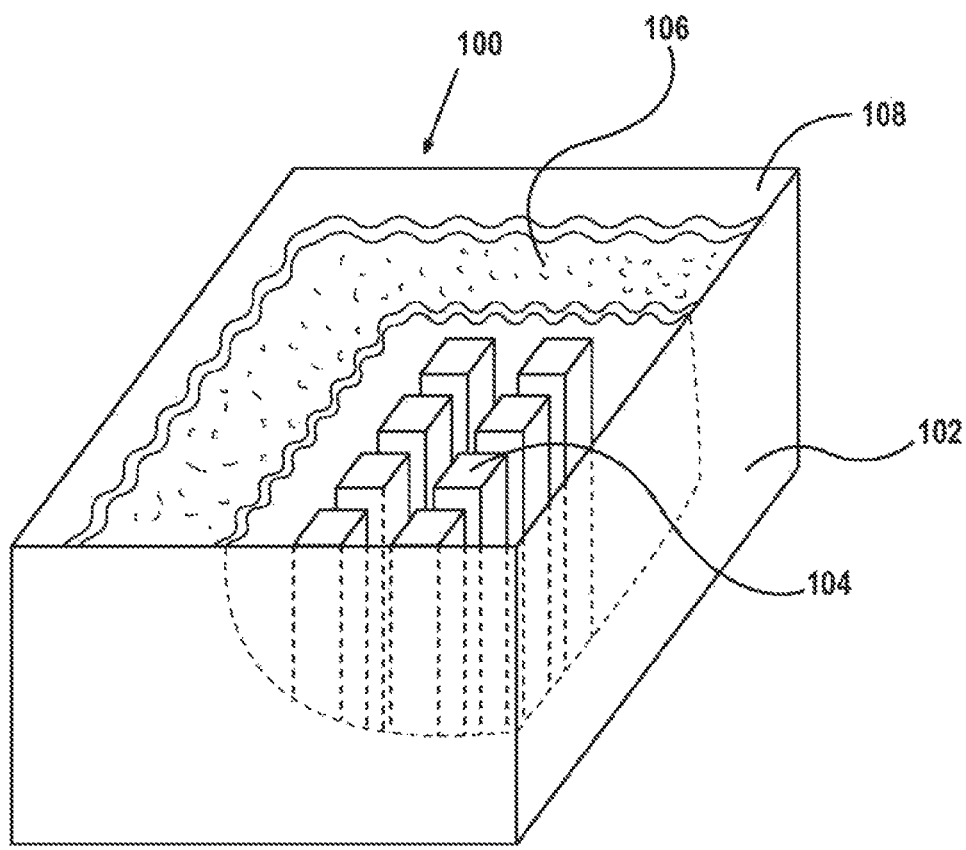
FIG. 1 is a perspective view of an energy storage device.
Figure 6:
FIG. 6 is a perspective view of a cover for an energy storage device enclosure.
Figure 7:
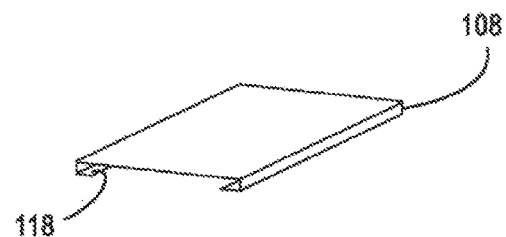
FIG. 7 is a perspective view of another cover for an energy storage device enclosure.

The subject matter disclosed herein relates to an enclosure for an energy storage device, such as a rechargeable battery. Referring generally to FIGS. 1 through 10, embodiments of an enclosure for an energy storage device and a method for packaging an energy storage device are disclosed. The enclosure for an energy storage device may support a wide variety of electrochemical cells, such as sodium-halide (e.g., sodium-metal-halide), sodium-sulfur, lithium-sulfur, and other available electrochemical cells used for energy storage. In one embodiment, the electrochemical cells have an operating temperature determined by the melting point of the materials utilized in the cells. For example, the operating temperature may be at least or greater than about 100 degrees Celsius, such as between 250 degrees Celsius and 400 degrees Celsius, or between 400 degrees Celsius and 700 degrees Celsius, but other desired operating temperatures are possible. In one embodiment, the operating temperature is between 250 and 350 degrees Celsius.

In some embodiments, the rechargeable energy storage cells have dimensions of about 37 mm×27 mm×240 mm, any of which dimensions may vary by up to +/−50%, in accordance with various embodiments. In other embodiments, the energy storage cells may have a diameter of about 10 mm and a length of between 110 mm and 210 mm. In embodiments, the chemistry of a cell is of the sodium-metal-halide type, in which NaCl and Ni are converted to Na and $NiCl_2$ during battery charging. The energy capacity of an energy storage cell can range from about 2 amp*hours to about 250 amp*hours. The rechargeable battery includes a plurality of energy storage cells with the battery housing sized to accommodate the plurality of energy storage cells. In one embodiment, the rechargeable battery includes one hundred energy storage cells and the battery housing has dimensions of about 400 mm×300 mm×300 mm. In other embodiments, the rechargeable battery may include at least 20 cells, at least 50 cells, or at least 150 cells, with the battery housing sized accordingly. In some embodiments, the battery housing is sized to accommodate more energy storage cells than are provided in the rechargeable battery. For example, a battery housing may accommodate up to 50 cells, but the rechargeable battery may be populated with only 40 cells based on the electrical requirements, and the remaining space within the housing may be occupied by a packing material or other support to inhibit movement of the battery cells disposed within the battery housing.

In various embodiments, a rechargeable battery includes a battery housing having a base portion, side portions extending from the base portion, and an aperture defined by the side portions. The rechargeable battery also includes a housing cover secured to the battery housing with a plurality of rechargeable energy storage cells disposed within the battery housing. In one embodiment, the energy storage cells are electrically connected by welded connections between the respective positive and negative terminals of the energy storage cells. The rechargeable battery also includes an insulator disposed between the rechargeable battery cells and the housing cover that inhibits movement of the energy storage cells and avoid stress to the welded intercell connections. In one embodiment, the housing includes a peripheral edge defining an aperture distal from the base portion through which the rechargeable energy storage cells are inserted into the interior volume of the battery housing. The aperture is sized to receive the one or more electrochemical cells during assembly of the rechargeable battery. In various embodiments, the insulator disposed between the energy storage cells and the housing cover is formed of one or more materials that are electrically or thermally insulating, or both. In one embodiment, the insulator includes discrete portions where a first portion such as an outer covering of the insulator is electrically insulating, while a second portion such as an interior portion of the insulator is thermally insulating. In one embodiment, the housing cover is securable to the peripheral edge of the battery housing. In this manner, the housing and cover are configured to contain at least one electrochemical cell at an operating temperature that is greater than about 100 degrees Celsius. In some embodiments, the housing and cover are configured to house electrochemical cells operating at temperatures greater than about 250 degrees Celsius, or greater than about 400 degrees Celsius.

Referring to FIG. 1, a cutaway of an embodiment of a rechargeable battery assembly 100 is illustrated. In the embodiment shown, the rechargeable battery includes a battery housing 102 for receiving one or more rechargeable energy storage cells 104. A cover 108 is secured to the battery housing 102 to enclose the cells 104 within the housing. An insulator 106 is provided between the housing cover 108 and the cells 104. In one embodiment, the insulator 106 includes a material having sufficient thickness in the direction "D" (see FIG. 10) between the housing cover and the housing base such that when the cover 108 is secured to the battery housing 102, pressure is applied to the insulator and to the cells 104 to inhibit movement of the cells. In some embodiments, when the housing 102 is enclosed by the cover 108, the insulator 106 is compressed.

FIG. 2 illustrates a perspective view of an embodiment of the battery housing 102. The housing 102 includes a base portion 110 and side portions 112 extending substantially perpendicular to the base portion 110 to form an aperture 114. In the embodiment illustrated, the base portion 110 is a rectangle and the battery housing 102 includes four side portions 112 arranged about the perimeter of the base portion 110. The aperture 114 therefore has a rectangular profile. Further, according to the illustrated embodiment, the side portions 112 are joined to one another in an abutting relationship.

According to various other embodiments of the battery housing 102 the base portion 110 may have a circular, hexagonal, oval, or other shaped profile and the side portions 112 extend from the perimeter of the base portion 110 to form the aperture 114. According to further variations, the side portions 112 may extend at an angle other than perpendicular to the base portion 110, or may be of unequal height, defining an irregular aperture 114.

Further embodiments of the battery housing 102 are shown and described with reference to FIGS. 3-6. According to the embodiment shown in FIG. 3, the side portions 112 of the housing 102 terminate at a top edge. According to a second embodiment, such as that shown in FIG. 4, attached to the side portions 112 may be a perimeter edge 116 extending about the open side of the aperture 114. According to the embodiment illustrated in FIG. 5 the perimeter edge 116 extends away from the aperture 114 and may be perpendicular to the side portion 112. According to the embodiment illustrated in FIG. 6, the perimeter edge 116 may extend into the aperture 114 and be perpendicular to the side portion 112. In various alternative embodiments, the perimeter edge 116 may extend at an acute or obtuse angle relative to the side portion 112 and may be bent, rolled, curved, or otherwise extend into or away from the aperture 114.

According to one embodiment, the housing 102 is constructed of a single stamped piece of metal. However, other fabrication methods are contemplated, including welding, extrusion, assembly with fasteners, casting, or other metal fabrication method or combination of fabrication methods. In one embodiment, the battery housing is a deep drawn enclosure. A deep drawn enclosure is formed from material, such as a section of sheet metal, that is press formed one or more times to achieve the desired configuration. In one embodiment, press forming includes stamping a section of steel metal using a die to alter the shape of the metal. The resulting deep drawn enclosure retains the continuity of the original material avoiding the formation of seams or other discontinuities. A deep drawn enclosure is a monolithic structure consisting of a single unbroken component.

Figure 8:
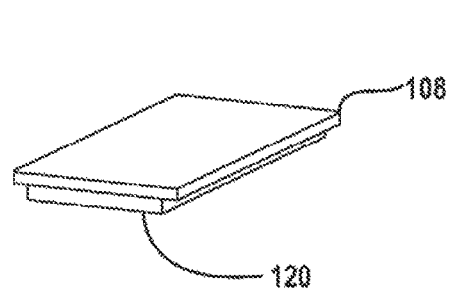
FIG. 8 is a perspective view of another cover for an energy storage device enclosure.
Figure 9:
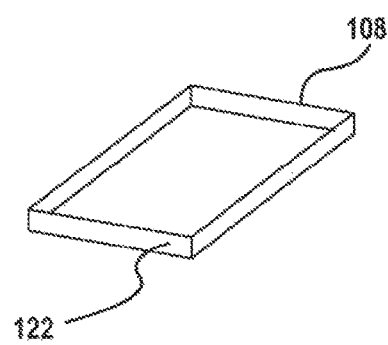
FIG. 9 is a perspective view of another cover for an energy storage device enclosure.
Figure 10:
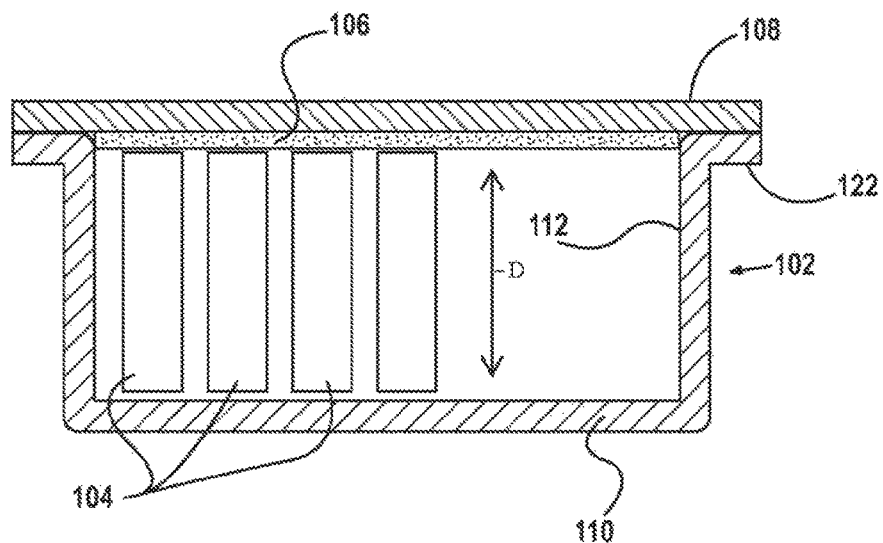
FIG. 10 is a cross-section view of an energy storage device.

Shown in FIGS. 7-10 are a variety of embodiments illustrating various covers. According to an embodiment, shown in FIG. 7, the cover 108 may be a planar member that has a profile matching the aperture 114. According to another embodiment, the cover 108 may include a channel 118 as shown in FIG. 8 for engaging the perimeter edge 116, for example in a sliding arrangement. According to another aspect shown in FIG. 9, the cover 108 may include a plug 120 to be received within the aperture 114 and the planar portion of the cover 108 may engage the side portions 112 or perimeter edge 116. According to yet another aspect, the cover 108 may include a lip edge 122 which may surround the side portion 112 when the cover 108 is positioned over the aperture 114.

According to the embodiment illustrated in FIG. 1, the rechargeable battery assembly 100 also includes an insulator 106 that provides thermal and electrical insulation between at least the cover 108 and rechargeable energy storage cells 104. According to various aspects of this embodiment, the insulator 106 may be constructed from Teflon® or other brand PTFE, fiberglass, mica, or other thermal and/or electrical insulator.

According to a first arrangement, the insulator 106 includes sheets of a substantially rigid insulating material that resists deformation when compressed, such as one or more mica sheets, arranged either in an overlapping, side-by-side, or stacked arrangement. According to alternative arrangements, the insulator 106 is a deformable insulation, such as woven fiberglass, that may compress, deform, and change in shape when a force is applied.

With regard to the first embodiment, the insulator 106 is positioned between the rechargeable energy storage cells 104 and cover 108 and a compressive force is applied to the cover 108. According to one aspect, this compressive force is at least 0.25 pounds per square inch ("psi") (at least 1.7 kpa). Alternatively or additionally, the compressive force may be sufficient to compress the insulator 106 at least 5% in the vertical dimension from its uncompressed state. Various methods for achieving this arrangement may be used, as will be described later with reference to the various arrangements of the housing 102 and cover 108.

Also disclosed is a method of assembling a rechargeable battery. Rechargeable energy storage cells 104 are inserted into a battery housing 102 having a base portion 110 and side portions 112 extending from the base portion 110 defining an aperture 114. The rechargeable energy storage cells 104 may be inserted through the aperture 114. An insulator 106 is provided on the rechargeable energy storage cells 104 and a housing cover 108 is secured to the housing 102 so as to compress the insulator 106. The method of assembling a rechargeable battery may also include evacuating the rechargeable battery after securing the housing cover to the battery housing. In an embodiment, the battery housing includes a sealable port configured for evacuating the interior of the battery housing such that the rechargeable energy storage cells are maintained at a reduced pressure. In one embodiment, the reduced pressure is a substantial vacuum that is maintained once the sealable port is sealed after evacuating the battery housing.

According to various embodiments of the above-described method, the battery housing 102 may include additional structure for supporting, engaging, receiving, or locking the rechargeable energy storage cells 104 in the housing 102. This structure may include, without limitation, clasps, rails, lips for frictional engagement, fasteners, openings for receiving fasteners, recesses, or other engagement structure.

Also according to various embodiments, the insulator 106 may include Teflon® or other brand PTFE, mica, fiberglass, or other thermal and electrical insulator. The insulator 106 may have a low ratio between applied force and displacement, such as woven fiberglass, or may have a high ratio, such as mica sheets. The compression ratio may alter the amount of force applied to the cover 108 in order to protect the rechargeable energy storage cells 104 against displacement due to vibration or damage.

According to the first embodiment, the cover 108 is secured to the housing 102 in order to provide a compression force to the insulator 106, thereby securing the rechargeable battery cells 104 against vibration forces.

According to a first aspect of this embodiment, the cover 108 may be first placed on the insulator 106. Next, a force may be applied to the cover 108 to compress the insulator 106 and electrochemical cells 104, either by deforming the insulator 106, some portion of the electrochemical cells 104, or some portion of the housing 102 (such as a bottom insulating layer or springs, not shown). This deformation will allow the cover 108 to contact the housing 102, whereby the cover 108 is secured to the housing by means of welding, fasteners, or other type of permanent or semi-permanent connection. According to this aspect, the compression force may be at least 0.25 psi (at least 1.7 kpa). In other embodiments, the compressive force may be at least 0.5 psi, or at least 1.0 psi. The level of compression force used in any given application will vary depending on the expected amplitude of the vibration of the rechargeable electrochemical cells 104.

According to another aspect, screws, nails, or other mechanical fasteners are used to secure the cover 108 to the housing 102. According to this aspect, the cover 108 includes through holes (not shown) and the perimeter edge 116 includes counter-fasteners (not shown), such as nuts, for receiving the fasteners. The cover 108 is first placed on the insulator 106 and screws are inserted into the through holes to engage the counter-fasteners. The screws may then be tightened, driving the cover 108 to the housing 102, thereby compressing the insulator 106 through displacement. According to one arrangement, the insulator 106 may be compressed by 10% of its thickness. In this aspect, the length of the fasteners will depend on the type of insulator chosen.

According to a further aspect of the invention, the cover 108 may include a channel 118 for slideably engaging the perimeter edge 116 of the housing 102. A compressive force may be applied to the insulator 106, for example at least 0.25 psi (at least 1.7 kpa), and the cover 108 may be slid on to the housing 102, thereby maintaining the compression by means of the interaction between the channel 118 and perimeter edge 116. According to one arrangement, once the cover 108 is in a secured position the cover 108 may be welded, fastened, or otherwise permanently secured to the housing 102.

According to a further aspect of the invention, the insulator 106 may have a thermal expansion rate so that the thickness of the insulator varies with ambient temperature. The insulator 106 is maintained at a base temperature during assembly whereby the insulator 106 is in an unexpanded state. Owing to the high operating temperature of the energy storage device, the temperature within the housing 102 will increase during operation, thereby causing the insulator 106 to try to expand. As heated cells expand, greater compression of the insulating material may result depending upon the coefficient of expansion of the materials used to construct the energy storage cells, the insulation, and the housing. However, expansion of the insulator 106 will be resisted by the cover 108, thereby providing the necessary compressive force against vibration. According to one variation, once thermally activated the insulator 106 maintains its expanded state even when the temperature is lowered. According to an alternative variation, the insulator 106 may be thermally responsive, expanding when heated and contracting when cooled.

According to a further aspect of the invention, the insulator 106 may be provided in an unexpanded state and expand upon contact with the air or other some other accelerator, such as a chemical accelerant. In this aspect, the cover 108 is positioned on the housing 102 when the insulator 106 is in an unexpanded state and the insulator 106 is allowed to expand after the cover 108 is secured to the housing 102. According to one variation, the insulator 106 may be provided on the rechargeable electrochemical cells 104 prior to the cover 108 being positioned on the housing 102. The cover 108 is then secured to the housing 102 and the insulator 106 is allowed to expand, thereby providing a compressive force. According to another variation, the insulator 106 may require an accelerator to expand. The insulator 106 may be provided on the rechargeable electrochemical cells 104 and the cover 108 secured to the housing 102. The cover 108 according to this variation includes an opening or through hole for receiving the accelerator. Once the insulator 106 receives the accelerator, the insulator may expand, thereby causing the desired compression force between the rechargeable electrochemical cells 104 and cover 108.

According to a further aspect of the invention, a combination of insulators may be provided. According to one variation of this aspect, a first insulator 106, such as a rigid mica sheet, is provided across the electrochemical cells 104 to provide structural support. A second insulator, such as a foaming insulation, is then provided between the rigid mica sheet and the cover 108, thereby providing the necessary compression force for securing the electrochemical cells 104 against vibration. According to another variation of this aspect, an easily deformable insulator 106, such as fiberglass, is first provided onto the electrochemical cells 104 to protect terminals or other components of the cells 104. A second, more rigid insulator 106, such as a mica sheet, is then provided over the first insulator, thereby providing additional structure and insulation. According to yet another variation a first insulator exhibiting high electrical resistance is provided across the electrochemical cells 104 and a second insulator exhibiting high thermal resistance is provided between the first insulator and the cover 108. Various other embodiments may also be appreciated.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be." The terms "generator" and "alternator" are used interchangeably herein (however, it is recognized that one term or the other may be more appropriate depending on the application). The term "instructions" as used herein with respect to a controller or processor may refer to computer executable instructions.

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not different from the literal language of the claims, or if they include equivalent structural elements with insubstantial differences from the literal language of the claims.

The invention claimed is:

1. A method of assembling a rechargeable battery comprising:
   inserting rechargeable energy storage cells into a battery housing, the battery housing having a base portion, a side portion extending from the base portion, and an aperture defined by the side portion, wherein the rechargeable energy storage cells are inserted into the battery housing through the aperture;
   installing a first insulator on the rechargeable energy storage cells, the first insulator comprising a rigid insulator;
   installing a second insulator on the first insulator, the second insulator being formed from a different material than the first insulator, the second insulator comprising a deformable insulator; and
   securing a housing cover to the battery housing such that the first insulator, the second insulator, and the rechargeable energy storage cells are maintained in compression between the base portion and a housing cover.

2. The method of assembling a rechargeable battery as claimed in claim 1, wherein the first insulator comprises a mica sheet and the second insulator comprises foaming insulation.

3. The method of assembling a rechargeable battery as claimed in claim 1, wherein the first insulator and the second insulator are compressed at least 5% in the direction between the base portion and the housing cover when the housing cover is secured to the battery housing.

4. The method of assembling rechargeable battery as claimed in claim 1, wherein securing the housing cover to the battery housing comprises applying at least 1.7 kpa of force to the housing cover to compress the first insulator and the second insulator.

5. The method of assembling a rechargeable battery as claimed in claim 1, wherein the compression of the first insulator and the second insulator inhibits movement of the energy storage cells in a direction between the housing cover and the base portion.

6. The method of assembling a rechargeable battery as claimed in claim 1, wherein the side portion of the battery housing comprises four sides forming a substantially rectangular cross-section of the battery housing.

7. The method of assembling a rechargeable battery as claimed in claim 1, wherein the battery housing comprises a deep drawn enclosure.

8. The method of assembling a rechargeable battery as claimed in claim 1, wherein the side portion of the battery housing is welded to the base portion to form the battery housing.

9. The method of assembling a rechargeable battery as claimed in claim 1, wherein the housing cover is secured to the battery housing by welding.

10. The method of assembling a rechargeable battery as claimed in claim 1, wherein the housing cover is secured to the battery housing by mechanical fasteners.

11. The method of assembling a rechargeable battery as claimed in claim 1, further comprising the step of evacuating the rechargeable battery after securing the housing cover to the battery housing.

12. The method of assembling a rechargeable battery as claimed in claim 1, wherein the rechargeable energy storage cells are sodium-halide cells.

13. A rechargeable battery comprising:
- a battery housing having a base portion, a side portion extending from the base portion, and an aperture defined by the side portion;
- a housing cover secured to the battery housing;
- a plurality of rechargeable energy storage cells disposed within the battery housing with at least a portion of the energy storage cells electrically connected to one another;
- a first insulator disposed between the rechargeable energy storage cells and a housing cover, the first insulator comprising a rigid insulator; and
- a second insulator disposed between the first insulator and the housing cover, the second insulator being formed from a different material than the first insulator, the second insulator comprising a deformable insulator,
- wherein the first insulator, the second insulator, and the energy storage cells are maintained in compression between the housing cover and the base portion.

* * * * *